United States Patent
Kajiura et al.

(10) Patent No.: US 6,855,231 B2
(45) Date of Patent: Feb. 15, 2005

(54) METHOD AND SYSTEM FOR PRODUCTION FULLERENE

(75) Inventors: Hisashi Kajiura, Kanagawa (JP); Mitsuaki Miyakoshi, Kanagawa (JP); Masashi Shiraishi, Tokyo (JP); Masafumi Ata, Kanagawa (JP); Atsuo Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 10/018,717
(22) PCT Filed: Apr. 18, 2001
(86) PCT No.: PCT/JP01/03327
§ 371 (c)(1),
(2), (4) Date: Dec. 18, 2001
(87) PCT Pub. No.: WO01/79113
PCT Pub. Date: Oct. 25, 2001

(65) Prior Publication Data
US 2003/0015414 A1 Jan. 23, 2003

(51) Int. Cl.[7] ............................. C07C 6/00; B01J 19/08; D01F 9/12
(52) U.S. Cl. ............................. 204/157.15; 423/447.3; 422/186
(58) Field of Search ................... 422/186; 204/157.15; 423/447.3

(56) References Cited

FOREIGN PATENT DOCUMENTS

| JP | 7-197325 | 8/1995 | ........... D01F/9/127 |
| WO | WO 94/04461 | 3/1994 | ........... C01B/31/00 |

OTHER PUBLICATIONS

Wang Miao et al. "Graphite Inkyoku Taisekibutsu no Sentanman ni okeru Cabon Nanotube no Seichou" 1996, vol. 36, pp. 160–167.

Chung–Hwa Kiang et al., "Catalytic Synthesis of Single Layer Carbon Nanotubes with a Wide Range of Diameters" vol. 98, No. 26, pp. 6612–6618.

A Loiseau et al., Sulfur the key for filling carbon nanotubes with metals, AIP Conf. Proc. 1999, vol. 486, pp. 268–272.

Chen Daizhang et al. Catalysis by minerals in synthesis of carbon nanotubes No. 17, p. 1199.

*Primary Examiner*—Steven Versteeg
(74) *Attorney, Agent, or Firm*—Bell, Boyd & Lloyd LLC

(57) ABSTRACT

Methods and devices for producing fullerene are provided. The present invention includes a pair of electrodes spaced apart to define a region wherein an arc discharge can be conducted between the electrode pair and a gas containing carbon can be supplied to the region such that fullerene can be easily and readily produced.

24 Claims, 3 Drawing Sheets

METHOD AND SYSTEM FOR PRODUCTION FULLERENE

BACKGROUND OF THE INVENTION

The present invention relates to a method and a device for producing fullerenes and more particularly to a method and a device for producing fullerenes capable of producing a large amount of fullerenes, particularly, carbon nanotubes with high yield.

A carbon nanotube is an allotrope of carbon and is generally known to exist in a single-walled or a multi-walled form composed of laminating rolled-up graphite sheet in a cylindrical form with the thickness of several atomic layer. The carbon nanotube is a microscopic material whose diameter ranges from about 0.5 nm to about 10 nm and whose length is about several mm.

The carbon nanotube attracts public attention as a material to be applied to many directions such as a semiconductor super-integrated circuit, a fibrous material, a hydrogen absorbing material, a catalyst, etc. as well as a cold cathode which has been already put to practical use. In particular, the carbon nanotube attracts public attention as a new carbon material, because it has a theoretically peculiar electrical property, has a large surface area although it is very fine, has a large aspect ratio, has a unique hollow configuration and has a unique surface property derived from the unique configuration.

From the above described actual circumstances, it has been desired to develop a method for easily producing a large amount of carbon nanotubes with high yield.

Fullerene as an allotrope of carbon has been also expected to be applied to a photosensitive member, a photoelectric transfer element, a solar battery, an optical limiter, toner, a non-linear optical element, a switching element, a superconductor, a transistor, a Josephson device, a sensor, a diode, a catalyst, an emitter, or the like. It has been desired to develop a method for readily producing a large amount of fullcrene with high yield similarly to the carbon nanotube.

A method for producing a carbon nanotube, wherein a mixture obtained by mixing catalyst metals, such as carbon and cobalt, is irradiated with a laser beam in an atmosphere of inert gas under reduced pressure to evaporate carbon and synthesize a nanotube and recover the carbon nanotube on, for instance, a cooled recovery rod whose end is tapered. A method wherein a carbon rod is used as an electrode and an arc discharge is generated in an atmosphere of inert gas under reduced pressure to allow a carbon nanotube to grow on the carbon rod, is known, as disclosed in, for instance, Japanese-Patent Application Laid-open No. hei. 6-280116 and Japanese Patent Application Laid-Open No. hei. 6-157016. As for the fullerene, a similar producing method has been proposed.

In the method that the mixture obtained by mixing the catalyst metals, such as carbon and cobalt, is irradiated with the laser beam, a laser light source is required, so that a device is large-scaled. In the method that the arc discharge is generated, since the carbon rod itself, which is the electrode, serves as a material for the carbon nanotube or fullerene, the amount of carbon nanotube or fullerene which can be produced is inconveniently restricted depending on the size of the carbon rod used as the electrode.

SUMMARY OF THE INVENTION

It is an advantage of the present invention to provide a method and a new device for producing fullerenes which can solve the above described problems of the related art.

It is another advantage of the present invention to provide a method and a device for producing fullerenes by which a large amount of fullerenes, particularly, carbon nanotubes can be easily and readily simply produced with high yield.

In order to achieve the above described advantages, according to the present invention, there is proposed a method for producing fullerene in such a manner that an arc discharge is generated between a pair of carbon rod electrodes and gas containing carbon is supplied to a part, member or region location between the pair of carbon rod electrodes.

According to an embodiment of the present invention, since the gas containing carbon serving as a raw material for fullerenes is supplied to the part between the pair of carbon rod electrodes, the amount of fullerenes which can be produced is not restricted depending on the size of the carbon rods used as the electrodes. In this regard, fullerenes can be synthesized for a long time and a large amount of fullerenes, particularly, carbon nanotubes can be easily and readily produced with high yield.

According to an embodiment of the present invention, the gas containing carbon is continuously supplied to the part between the pair of carbon rod electrodes. The gas containing carbon includes gas having hydrocarbon gas as a main component. The gas containing carbon includes methane. Further, the gas containing carbon desirably includes sulfur.

According to an embodiment of the present invention, when fullerenes and, especially, carbon nanotubes are produced, the gas containing carbon includes sulfur serving as an accelerator in addition to methane, so that the fullerenes, particularly, the carbon nanotubes can be accelerated to be produced.

In an embodiment, the gas containing carbon used in the present invention includes methane and hydrogen sulfide. Since the gas containing carbon includes hydrogen sulfide including sulfur serving as the accelerator, the fullerenes and, especially, the carbon nanotubes can be accelerated to be produced.

According to an embodiment of the present invention, the gas containing carbon is allowed to pass through thiophene so that the gas containing carbon includes sulfur.

According to an embodiment of the present invention, the gas containing carbon is bubbled into thiophene so that the gas containing carbon includes sulfur.

Further, according to an embodiment of the present invention, hydrogen gas and/or inert gas is supplied in addition to the gas containing carbon to the part between the pair of carbon rod electrodes. Here, as the inert gas, helium or argon is employed, and further, xenon, krypton or nitrogen or the like can be employed.

According to the an embodiment of the present invention, the carbon rod electrode of the pair of carbon rod electrodes serving as an anode includes catalyst metal. The catalyst metal is composed of one or two or more of metals including Co, Ni, Sc, V, Cr, Mn, Fe, Cu, Y, Zr, Nb, Mo, Pd, Ta, W, Au, Th, U, La, Ce, Pr, Nd, Gd, Tb, Dy, Ho, Er, Tm, Lu like metals or mixtures thereof. Since the carbon rod electrode serving as the anode includes the above mentioned catalyst metals, metal-containing fullerenes which contain these catalyst metals can be efficiently produced.

In an embodiment of the present invention, a device for producing fullerene includes a pair of carbon rod electrodes; and a gas supply mechanism capable of continuously supplying gas containing carbon to a part or region between the pair of carbon rod electrodes.

Since the device for producing fullerene according to an embodiment of the present invention includes the gas supply mechanism capable of supplying the gas containing carbon as a raw material of fullerenes to a part between a pair of carbon rod electrodes, the amount of fullerenes which can be produced is not restricted depending on the size of the carbon rods used as the electrodes. In this regard, the fullerenes can be synthesized for a long time and a large amount of fullerenes and, especially, carbon nanotubes can be simply produced with high yield.

Further, in the device according to an embodiment of the present invention, one of the pair of carbon rod electrodes has a through hole opened to the part between the pair of carbon rod electrodes. In this regard, the gas supply mechanism can supply the gas containing carbon to the part between the pair of carbon rod electrodes through the through hole.

As described above, since one of the pair of carbon rod electrodes has the through hole opened to the part between the pair of carbon rod electrodes and the gas containing carbon can be supplied to the part between the carbon rod electrodes through the through hole, the gas containing carbon can be assuredly supplied to an arc discharge part between the pair of carbon rod electrodes. In this regard, the amount of fullerenes which can be produced is not restricted by the size of carbon rods used as the electrodes. Thus, the fultlerenes can be synthesized for a long time and a large amount of fullerenes and, especially, carbon nanotubes can be easily and readily produced with high yield.

In the device according to an embodiment of the present invention, the gas supply mechanism includes a pipe having a nozzle opposed to the part between the pair of carbon rod electrodes.

The device for producing fullerene according to an embodiment of the present invention further includes a material gas supply source for supplying the gas containing carbon to the gas supply mechanism.

The material gas supply source is adapted to supply gas containing hydrocarbon gas as a main component to the gas supply mechanism according to an embodiment of the present invention.

The device for producing fullerene according to an embodiment of the present invention further includes a hydrogen gas supply source and/or an inert gas supply source for supplying hydrogen gas and/or incrt gas to the gas supply mechanism. Here, as the inert gas, helium or argon is used, and further, xenon, krypton, nitrogen or the like can be employed.

In the device for producing fullerene according to an embodiment of the present invention, the material gas supply source is adapted to supply methane to the gas supply mechanism.

The device for producing fullerene according to an embodiment of the present invention further includes a sulfur adding mechanism for adding sulfur to the gas containing carbon between the material gas supply source and the gas supply mechanism. Since the sulfur adding mechanism is provided and the gas containing carbon includes sulfur serving as an accelerator when the fullerenes and, especially, the carbon nanotubes are produced, the fullerenes the carbon nanotubes are accelerated to be produced.

The device for producing fullerene according to an embodiment of the present invention further includes a hydrogen sulfide supply source for supplying hydrogen sulfide to the gas supply mechanism. As described above, the hydrogen sulfide supply source is provided and the gas containing carbon includes hydrogen sulfide containing sulfur serving as an accelerator in addition to methane, so that the fullerenes and, especially, the carbon nanotubes can be accelerated to be produced.

In the device for producing fullerene according to an embodiment of the present invention, the carbon rod electrode of the pair of carbon rod electrodes serving as an anode includes catalyst metal. The catalyst metal is composed of one or two or more of metals including Co, Ni, Sc, V, Cr, Mn, Fe, Cu, Y, Zr, Nb, Mo, Pd, Ta, W, Au, Th, U, La, Ce, Pr, Nd, Gd, Tb, Dy, Ho, Er, Tm, Lu like metals or combinations thereof. The carbon rod electrode serving as the anode includes these catalyst metals so that metal-containing fullerenes containing these catalyst metals can be efficiently produced.

Additional features and advantages of the present invention are described in, and will be apparent from, the following Detailed Description of the Invention and the Figures.

DETAILED DESCRIPTION OF THE INVENTION

Figure 1:
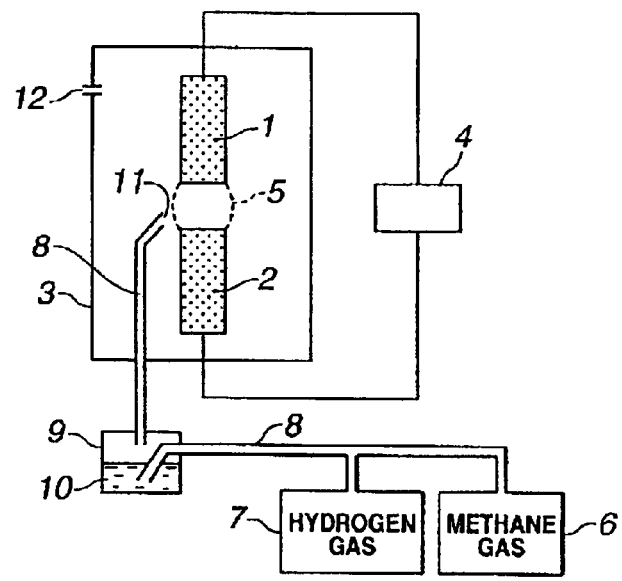
FIG. 1 is a side view showing one embodiment of a device for producing carbon nanotubes according to the present invention.

Now, referring to the drawings, a method for producing fullerenes according to the present invention, in particular, a device used for producing carbon nanotubes will be described below.

In an embodiment, the device for producing carbon nanotubes according to the present invention includes, as shown in FIG. 1, a first carbon rod electrode 1 serving as an anode and a second carbon rod electrode 2 serving as a cathode. A pair of the first and second carbon rod electrodes 1 and 2 are arranged in a reaction vessel 3 so that one end of one electrode is opposed to one end of the other electrode. The other ends of the first carbon rod electrode 1 and the second carbon electrode 2 are respectively connected to a DC power source 4 so that an arc discharge 5 can be generated between a pair of the first carbon rod electrode 1 and the second carbon rod electrode 2. Here, for the carbon rod electrode 1 serving as the anode, is employed a carbon rod including Co and Ni which finction as catalysts when the carbon nanotube is produced.

The device for producing carbon nanotubes according to an embodiment of the present invention further includes, as shown in FIG. 1, a methane gas vessel 6 and a hydrogen gas vessel 7. Methane gas supplied from the methane gas vessel 6 and hydrogen gas supplied from the hydrogen gas vessel 7 are mixed together in a gas supply pipe 8 and the mixed gas is guided to a thiophene tank 9. The mixed gas of methane and hydrogen is introduced into thiophene 10 and bubbled therein, sulfur is added to the mixed gas and the sulfur added gas is guided to the reaction vessel 3 through the gas supply pipe 8.

The gas supply pipe 8 is provided with, as shown in FIG. 1, a nozzle opposed to a part between a pair of the first carbon rod electrode 1 and the second carbon rod electrode 2 in which the am discharge 5 is generated. The mixed gas of methane and hydrogen is supplied from the nozzle 11 to the part between a pair of the first carbon rod electrode and the second carbon rod electrode 2 in which the arc discharge 5 is generated. The reaction vessel 3 is further provided with a gas discharge part 12.

The device for producing carbon nanotubes according to an embodiment of the present invention produces carbon nanotubes in such a manner as described below.

When an electric current is supplied to the first and second carbon rod electrodes 1 and 2 from the DC power source 4, the arc discharge 5 is generated between one pair of the first and second carbon rod electrodes 1 and 2.

At the same time, methane gas and hydrogen gas are respectively supplied, for instance, in the volume ratio 1:5 from the methane gas vessel 6 and the hydrogen gas vessel 7 to the gas supply pipe 8. These gases are mixed each other in the gas supply pipe 8, then, the mixed gas is guided to the thiophene tank 9 and introduced into the thiophene 10 and bubbled therein and sulfur is added to the mixed gas.

The mixed gas of methane and hydrogen to which sulfur is added in the thiophene tank 9 is guided to the reaction vessel 3 through the supply pipe 8, and supplied at a prescribed flow velocity from the nozzle 11 to the part or region between a pair of the first carbon rod electrode 1 and the second carbon rod electrode 2 in which the arc discharge 5 is generated. As a result, a carbon nanotube is produced to enable the carbon nanotube to grow on the second carbon rod electrode 2.

In the device for producing fullerene according to an embodiment of the present invention, since the mixed gas of methane and hydrogen is supplied to the part in which the arc discharge 5 is generated, the flow velocity of the mixed gas of methane and hydrogen is selected so that the phenomenon that the produced carbon nanotube is accumulated on the second carbon rod 2 to decrease its discharge area is effectively prevented and the carbon nanotube can be produced with high yield. It should be appreciated that accumulation on the second carbon rod electrode 2 of the carbon nanotube is undesirable because this would necessarily decrease the discharge area of the rod electrode 2 and thus impede arc disclosure.

In an embodiment, the produced carbon nanotube is preferably rapidly cooled. In the device according to the present invention, since the mixed gas of methane and hydrogen is supplied to a high temperature part in which the arc discharge 5 is generated, the carbon nanotube produced by the mixed gas of methane and hydrogen can be effectively cooled. Further, the flow velocity of the mixed gas of methane and hydrogen is selected, so that cooling speed can be controlled to desired speed.

In the device for producing a carbon nanotube according to an embodiment of the present invention, since the mixed gas of methane and hydrogen which serves as the material of the carbon nanotube is supplied at a prescribed flow velocity from the nozzle 11 to the part between a pair of the first and second carbon rod electrodes 1 and 2 in which the arc discharge 5 is generated, the amount of carbon nanotube which can be produced is not limited depending on the size of the carbon rods used as the electrodes, and the carbon nanotube can be synthesized for a long time. Therefore, a large amount of the carbon nanotube can be easily and readily produced with high yield as compared with the conventional device.

Further, in the device according to an embodiment of the present invention, the flow velocity of the mixed gas of methane and hydrogen supplied to the part between a pair of the first and second carbon rod electrodes 1 and 2 in which the arc discharge 5 is generated is selected so that the phenomenon that the produced carbon nanotube is accumulated on the second carbon rod electrode 2 to decrease its discharge area can be effectively decreased, and the carbon nanotube can be produced with high yield.

Further, in the device according to an embodiment of the present invention, the produced carbon nanotube can be effectively cooled by the mixed gas of methane and hydrogen supplied to the part between a pair of the first carbon rod electrode 1 and the second carbon rod electrode 2 in which the arc discharge 5 is generated. Further, the flow velocity of the mixed gas of methane and hydrogen is selected so that the cooling speed can be controlled to a desired value.

Further, the mixed gas of methane and hydrogen is guided to the thiophene tank 9, introduced into the thiophene 10 and bubbled therein. Then, since the resultant mixed gas is supplied together with sulfur serving as an accelerator upon producing carbon nanotube to the part between a pair of the first carbon rod electrode 1 and the second carbon rod electrode 2 in which the arc discharge 5 is generated, the production of the carbon nanotube can be enhanced.

In the above described device for producing the carbon nanotube, although sulfur is added to the mixed gas obtained by adding hydrogen gas to methane gas used as the gas containing carbon and the sulfur added mixed gas is supplied to the part between the first and second carbon rod electrodes 1 and 2 in which the arc discharge 5 is generated, inert gas may be mixed to methane gas in place of hydrogen gas. As the inert gas, helium or argon can be used, and further, xenon, krypton, nitrogen or the like may be employed. In the case of a device for producing a carbon nanotube by using the inert gas, an inert gas vessel is used in place of the hydrogen gas vessel 7 in the producing device shown in FIG. 1.

Also in this case, the methane gas and the inert gas are supplied, for instance, in the volume ratio 1:5, to the gas supply pipe 8, they are mixed together in the gas supply pipe 8, and then, the mixed gas is guided to the thiophene tank 9, introduced into the thiophene 10 and bubbled therein and sulfur is added to the mixed gas.

Even when the inert gas is used in such a manner, a large amount of carbon nanotube can be readily and easily produced with high yield.

Figure 2:
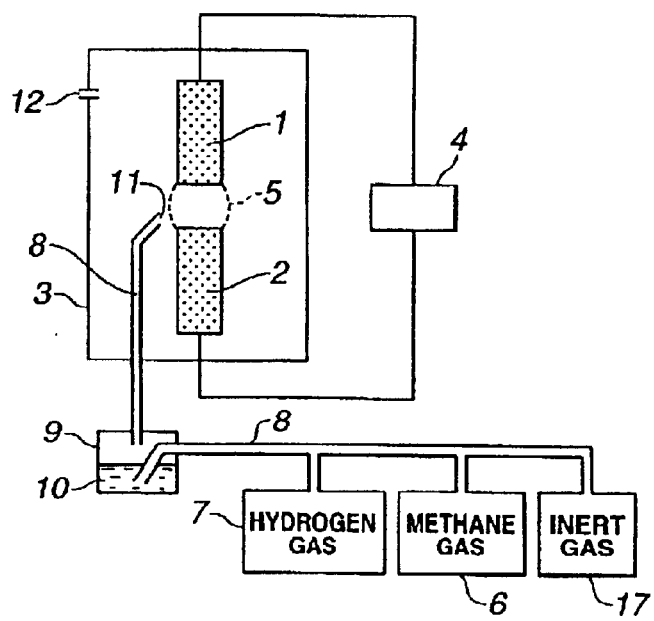
FIG. 2 is side view showing another embodiment of a device for producing carbon nanotubes according to the present invention.

Still further, in the device for producing the carbon nanotube according to an embodiment of the present invention, the hydrogen gas and the inert gas may be mixed with the methane gas used as the gas containing carbon. In this case, as shown in FIG. 2, an inert gas vessel 17 is arranged in parallel with a methane gas vessel 6 and a hydrogen gas vessel 7 in a device for producing a carbon nanotube. Then, methane gas supplied from the methane gas vessel 6, hydrogen gas supplied from the hydrogen gas vessel 7 and inert gas supplied from the inert gas vessel 17 are mixed together in a gas supply pipe 8 and the mixed gas is guided to a thiophene tank 9.

In the device for producing a carbon nanotube, the methane gas, the inert gas and the hydrogen gas are supplied, for instance, in the volume ratio 1:1:4 to the gas supply pipe 8, and mixed together in the gas supply pipe 8, and then, the mixed gas is guided to the thiophene tank 9, introduced to thiophene 10 and bubbled therein, and sulfur is added to the mixed gas.

Even when the inert gas is mixed to the methane gas together with the hydrogen gas as described above, a large amount of carbon nanotubes can be easily and readily produced with high yield.

In an embodiment, a device for producing a carbon nanotube according to the present invention will be described with reference to FIGS. 3 and 4.

Figure 3:
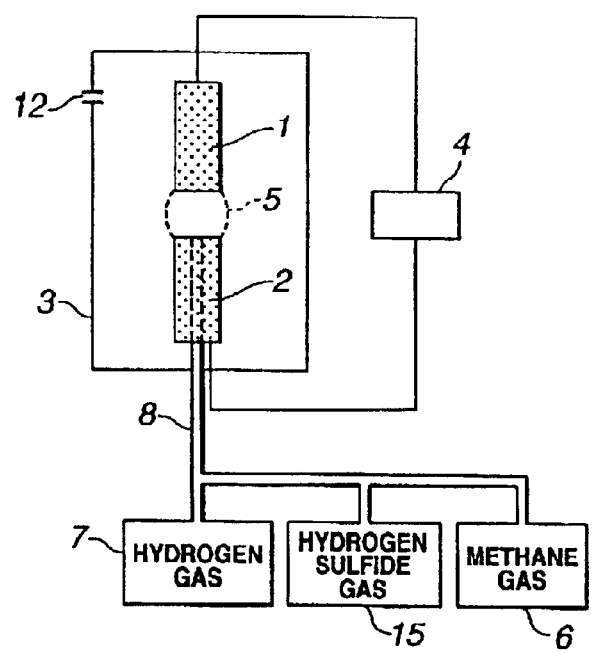
FIG. 3 is a side view showing yet another embodiment of a device for producing carbon nanotubes according to the present invention.

In a device for producing a carbon nanotube, according to an embodiment as shown in FIG. 3, a hydrogen sulfide gas vessel 15 is provided in addition to a methane gas vessel 6 and a hydrogen gas vessel 7. Methane gas and hydrogen sulfide gas are mixed together, for instance, in the volume ratio 9:1. Further, the obtained mixed gas of methane gas and hydrogen sulfide gas, and hydrogen gas are mixed together, for instance, in the volume ratio 1:5, and the mixed gas of methane, hydrogen sulfide and hydrogen is supplied to a reaction vessel 3. In the device shown in FIG. 3, a thiophene tank is not provided as in the above described devices for producing a carbon nanotube.

Figure 4:
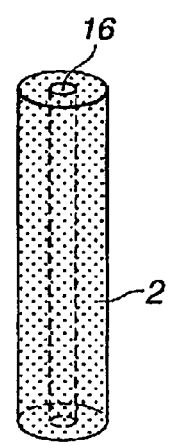
FIG. 4 is a perspective view showing a carbon rod electrode used as a cathode in the device for producing carbon nanotubes shown in FIG. 3.

In the device for producing a carbon nanotube according to an embodiment of the present invention shown in FIGS. 3 and 4, a through hole 16 passes through a carbon rod electrode serving as a cathode along the longitudinal axis of the carbon rod electrode, and is opened to a part between a pair of a first carbon rod electrode 1 and the second carbon rod electrode 2. The through hole 16 forms a part of a gas supply pipe.

The carbon nanotube is produced in such a manner as described below by employing the device for producing a carbon nanotube constructed as described above.

When an electric current is supplied to the first and second carbon rod electrodes 1 and 2 from a DC power source 4, an arc discharge is generated in a part between a pair of the first and second carbon rod electrodes 1 and 2.

At the same time, the methane gas and the hydrogen sulfide gas are respectively supplied from the methane gas vessel 6 and the hydrogen sulfide gas vessel 15, for instance, in the volume ratio 9:1, to the gas supply pipe 8. Further, the hydrogen gas is supplied to the gas supply pipe 8 from the hydrogen gas vessel 7, and the obtained mixed gas of methane gas and the hydrogen sulfide gas, and the hydrogen gas are mixed together, for example, in the volume ratio 1:5 and the mixed gas of methane, hydrogen sulfide and hydrogen is supplied to the through hole 16 formed in the carbon rod electrode 2 by the gas supply pipe 8.

Since the through hole 16 is formed so as to be opened to the part between a pair of the first carbon rod electrode 1 and the second carbon rod electrode 2, the mixed gas of methane, hydrogen sulfide and hydrogen supplied to the through hole 16 is supplied to the part of the arc discharge 5 formed between a pair of the first carbon rod electrode 1 and the second carbon rod electrode 2 at a prescribed flow velocity. In consequence, a carbon nanotube is formed and the carbon nanotube is allowed to grow on the carbon rod electrode 2.

Since the device for producing a carbon nanotube according to an embodiment of the present invention is utilized so that the mixed gas of methane, hydrogen sulfide and hydrogen which is a raw material for the carbon nanotube is supplied through the through hole 16 formed in the carbon rod electrode 2 serving as the cathode and opened to the part between a pair of the carbon rod electrode 1 and the carbon rod electrode 2, the mixed gas of methane, hydrogen sulfide and hydrogen as the raw material for the carbon nanotube can be directly supplied to the part of the arc discharge 5 generated between a pair of the first carbon rod electrode 1 and the second carbon rod electrode 2 to produce the carbon nanotube. The device for producing a carbon nanotube according to the present invention is employed so that the amount of the carbon nanotubes which can be produced is not restricted by the size of the carbon rods used as the electrodes and the carbon nanotubes can be synthesized for a long period. Therefore, a larger amount of carbon nanotubes can be easily and readily produced with higher yield than that produced by the conventional device.

In the device for producing a carbon nanotube according to an embodiment of the present invention, the flow velocity of the mixed gas of methane, hydrogen sulfide and hydrogen supplied to the part between a pair of the first carbon rod electrode 1 and the second carbon rod electrode 2 in which the arc discharge 5 is generated is selected, and accordingly, a state that the produced carbon nanotube is accumulated on the carbon rod electrode 2 to decrease its discharge area can be effectively prevented, and the carbon nanotube can be produced with high yield.

Further, in the device for producing a carbon nanotube according to an embodiment of the present invention, the produced carbon nanotube can be effectively cooled by the mixed gas of methane, hydrogen sulfide and hydrogen supplied to the part between a pair of the carbon rod electrode 1 and the carbon rod electrode 2 in which the arc discharge 5 is generated. Still further, the flow velocity of the mixed gas of methane and hydrogen is selected so that the cooling speed can be controlled as desired.

Still further, according to the device for producing a carbon nanotube of the present invention, since the hydrogen sulfide gas containing sulfur functioning as an accelerator when the carbon nanotube is produced is mixed with the methane gas and the hydrogen gas, and the mixed gas of methane, hydrogen sulfide and hydrogen is supplied to the part between a pair of the first carbon rod electrode 1 and the second carbon rod electrode 2 in which the arc discharge 5 is generated, the production of the carbon nanotube can be accelerated.

In the device for producing the carbon nanotube shown in FIGS. 3 and 4, although the hydrogen sulfide vessel 15 is provided in addition to the methane gas vessel 6 and the hydrogen gas vessel 7, the hydrogen gas is further mixed with the mixed gas of methane gas and hydrogen sulfide gas and the mixed gas of methane, hydrogen sulfide and hydrogen is supplied to the reaction vessel 3, the inert gas may be mixed with the methane gas in place of the hydrogen gas. As the inert gas, helium or argon is used, and further, xenon, krypton, or nitrogen or the like may be employed. In the case of the device for producing a carbon nanotube which employs the inert gas, the inert gas vessel is used in place of the hydrogen gas vessel 7 in the device shown in FIG. 3. Also in this case, the methane gas and the hydrogen sulfide gas are mixed together, for instance, in the volume ratio 9:1, and further, the obtained mixed gas of methane gas and the hydrogen sulfide gas, and the inert gas are mixed together, for instance, in the volume ratio 1:5. Then, the mixed gas of methane, hydrogen sulfide and inert gas is adapted to be supplied to the reaction vessel 3.

Even when the inert gas is employed as described above, a large amount of carbon nanotubes can be easily produced so as to have a high yield.

Figure 5:
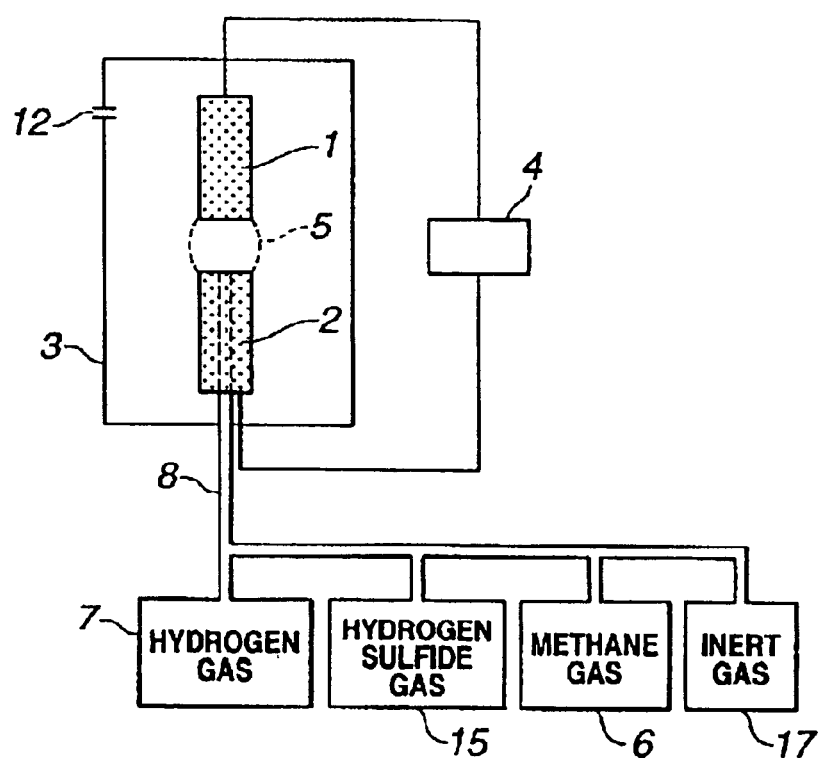
FIG. 5 is a side view showing still another embodiment of a device for producing carbon nanotubes according to the present invention.

Still further, in the device for producing a carbon nanotube according to an embodiment of the present invention, the hydrogen gas and the inert gas may be further mixed with the mixed gas of the methane gas and the hydrogen sulfide gas, and the mixed gas of methane, hydrogen sulfide, hydrogen and inert gas may be supplied to the reaction vessel 3. A device for producing a carbon nanotube in this case has a hydrogen sulfide gas vessel 15 provided in addition to a methane gas vessel 6 and a hydrogen gas vessel 7, and further, an inert gas vessel 17 provided in parallel therewith, as shown in FIG. 5.

In the device for producing a carbon nanotube, methane gas and hydrogen sulfide gas are mixed together, and further, hydrogen gas and inert gas are mixed with the mixed gas of the methane gas and the hydrogen sulfide gas and the obtained mixed gas is supplied to a reaction vessel 3. In this case, the hydrogen gas, the inert gas, the methane gas and the hydrogen sulfide gas are mixed together in the volume ratio 4:1:0.9:0.1.

Even when the hydrogen gas and the inert gas are further mixed in such a manner as described above, a large amount of carbon nanotubes can be readily and/or easily produced with high yield.

Applicants have conducted a number of tests to demonstrate the efficacy of the present invention. The following examples are illustrative of an embodiment of the present invention and, thus, are not intended to limit the scope of the present invention.

EXAMPLE 1

A carbon nanotube was produced by using a device for producing a carbon nanotube shown in FIG. 1.

The mixed gas obtained by mixing hydrogen gas and methane gas together in the volume ratio 5:1 was supplied to a reaction vessel at a flow velocity of 100 ml/minute. The pressure in the reaction vessel was maintained to about $1.33 \times 10^3$ Pascal. A direct current (DC) voltage of 25V was applied to a part or region between a pair of carbon rod electrodes to perform a reaction for about 45 minutes. At this time, an electric current generated between a pair of the carbon rod electrodes was produced at about 150A. In this case, a thiophene tank was not provided so that the hydrogen gas and the methane gas were directly introduced into the reaction vessel.

As the carbon rod electrode serving as an anode, a carbon rod including Co/Ni a ratio of about 1.2/1.2 (mol %) was used and a carbon rod with the diameter of about 10 mm and the length of about 100 mm was used for each carbon rod electrode.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerenes, carbon nanotubes or the like.

Further, after the reaction was completed, when the length of the carbon rod electrode used as the anode was measured and the decreasing speed of the carbon rod electrode used as the anode was calculated, the decreasing speed was about 5.2 cm/hour.

EXAMPLE 2

A carbon nanotube was produced in the same manner as that of the Example 1 except that hydrogen gas and methane gas were mixed together in the volume ratio 5:1 and the obtained mixed gas was supplied to a reaction vessel at a flow velocity of 100 ml/minute and the pressure in the reaction vessel was maintained to $3.33 \times 10^3$ Pascal.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and the decreasing speed of the carbon rod electrode used as the anode was calculated, the decreasing speed was 5.1 cm/hour.

EXAMPLE 3

A carbon nanotube was produced in the same manner as that of the Example 1 except that hydrogen gas and methane gas were mixed together in the volume ratio 5:1 and the obtained mixed gas was supplied to a reaction vessel at a flow velocity of 100 ml/minute and the pressure in the reaction vessel was maintained to $6.33 \times 10^3$ Pascal.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and the decreasing speed of the carbon rod electrode used as the anode was calculated, the decreasing speed was 5.1 cm/hour.

EXAMPLE 4

A carbon nanotube was produced by using a device for producing a carbon nanotube shown in FIG. 2.

The mixed gas obtained by mixing hydrogen gas, argon gas and methane gas together in the volume ratio 4:1:1 was supplied to a reaction vessel at a flow velocity of 100 ml/minute. The pressure in the reaction vessel was maintained to about $1.33 \times 10^3$ Pascal. DC voltage of 25V was applied to a part between a pair of carbon rod electrodes to perform a reaction for about 45 minutes. At this time, an electric current generated between a pair of the carbon rod electrodes was about 150A.

As the carbon rod electrode serving as an anode, a carbon rod including Co/Ni at the rate of 1.2/1.2 (mol %) was used and a carbon rod with the diameter of 10 mm and the length of 100 mm was used for each carbon rod electrode.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and the decreasing speed of the carbon rod electrode used as the anode was calculated, the decreasing speed was 5.1 cm/hour.

EXAMPLE 5

A carbon nanotube was produced by using the device for producing a carbon nanotube shown in FIGS. 3 and 4.

A carbon nanotube was produced in the same manner as that of the Example 3 except that a carbon rod having a through hole formed along a longitudinal axis with the diameter of 2 mm including the longitudinal axis was used as a cathode, hydrogen gas and methane gas and hydrogen sulfide gas were mixed together in the volume ratio 5:0.9:0.1 and the obtained mixed gas was supplied to a reaction vessel through the through hole.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and the decreasing speed of the carbon rod electrode used as the anode was calculated, the decreasing speed was 3.6 cm/hour.

EXAMPLE 6

A carbon nanotube was produced in the same manner as that of the Example 3 except that the thiophene tank was provided and hydrogen gas and methane gas were bubbled in the thiophene, and then, introduced into the reaction vessel.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and Ihe decreasing speed of the carbon rod electrode used as the anode was calculated, the decreasing speed was 3.6 cm/hour.

EXAMPLE 7

A carbon nanotube was produced by using the device for producing a carbon nanotube shown in FIG. 5.

A carbon rod having a through hole formed along a longitudinal axis with the diameter of 2 mm including the longitudinal axis was used as a cathode, methane gas and hydrogen sulfide gas were mixed together and further, hydrogen gas and inert gas were mixed with the mixed gas of the methane gas and the hydrogen sulfide gas and the obtained mixed gas was supplied to the reaction vessel 3 through the through hole. At this time, hydrogen gas, argon gas, methane gas, and hydrogen sulfide gas were mixed together in the volume ratio 4:1:0.9:0.1. The carbon nanotube was produced in the same manner as that of the Example 3 except that the types of the mixed gas and the mixed ratio were different from those of the Example 3.

Alter the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and the decreasing speed of the carbon rod electrode used as the anode was calculated, the decreasing speed was 3.5 cm/hour.

COMPARATIVE EXAMPLE 1

A carbon nanotube was produced under the sarne reaction conditions as those of the Example 1 that hydrogen gas was introduced to the reaction vessel, the pressure in the reaction vessel is maintained to $1.33 \times 10^3$ Pascal, and the DC voltage of 25V was applied to the part between a pair of carbon rod electrodes to perform a reaction for 45 minutes except that methane gas was not introduced to the reaction vessel.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and the decreasing speed of the carbon rod electrode used as the anode was calculated, the decreasing speed was 6.0 cm/hour.

COMPARATIVE EXAMPLE 2

A carbon nanotube was produced under the same reaction conditions as those of the Example 1 that hydrogen gas was introduced to the reaction vessel, the pressure in the reaction vessel is maintained to $3.33 \times 10^3$ Pascal, and the DC voltage of 25V was applied to the part between a pair of carbon rod electrodes to perform a reaction for 45 minutes except that methane gas was not introduced to the reaction vessel.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and the decreasing speed of the carbon rod electrode used as the anode was calculated, the decreasing speed was 6.3 cm/hour.

COMPARATIVE EXAMPLE 3

A carbon nanotube was produced in the same reaction conditions as those of the Example 1 that hydrogen gas was introduced to the reaction vessel, the pressure in the reaction vessel is maintained to $3.33 \times 10^3$ Pascal, and the DC voltage of 25V was applied to the part between a pair of carbon rod electrodes to perform a reaction for 45 minutes except that methane gas was not introduced to the reaction vessel.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and the decreasing speed of the carbon rod electrode used as the anode was calculated, the decreasing speed was 6.6 cm/hour.

COMPARATIVE EXAMPLE 4

A carbon nanotube was produced in the same manner as that of the Example 4 except that a carbon rod having a though hole formed along a longitudinal axis with the diameter of 2 mm including the longitudinal axis was used as a cathode and hydrogen gas was supplied through the through hole and methane gas was not supplied.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fuUerene mainly composed of carbon nanotubes.

Further, after the reaction was completed, when the length of the carbon rod electrode used as the anode was measured and the decreasing speed of the carbon rod electrode used as the anode was calculated. the decreasing speed was 6.5 cm/hour.

COMPARATIVE EXAMPLE 5

A carbon nanotube was produced in the same manner as that of the Example 5 except that the thiophene tank was provided and hydrogen gas was bubbled in the thiophene, and then, introduced into the reaction vessel and methane gas was not introduced to the reaction vessel.

After the reaction was completed, a web type product was recognized on the upper inner wall surface of the reaction vessel. The web type product was recovered and observed by using a scanning electron microscope (SEM) and a transmission electron microscope (TEM), so that it was recognized that the web type product was a carbonaceous material including fullerene mainly composed of carbon nanotubes.

Further, after the reaction was completed, when the length of the carbon rod electrode used as the anode was measured and the decreasing speed of the carbon rod electrode used as the anode was calculated, the decreasing speed was 6.5 cm/hour.

It was found from the Example 1 to 7 and the Comparative Example 1 to 5 that, when the methane gas as the raw material for fullerenes was supplied to the reaction vessel, the decreasing speed of the carbon rod electrode used as the anode was lower than that of a case in which only the hydrogen gas was supplied to the reaction vessel, so that the fullerenes could be continuously synthesized for a long time. Further, it was recognized that, when a reaction time was equal to the above, more fullerenes, especially, carbon nanotubes could be produced.

The present invention is not limited to the embodiments and the Examples described by referring to the attached drawings, and various kinds of changes may be performed within a scope without departing from the scope of the present invention.

For instance, although the device for producing a carbon nanotube shown in FIG. 1 includes the methane gas vessel 6, the hydrogen gas vessel 7 and the thiophene tank 9, and the device for producing a carbon nanotube shown in FIGS. 3 and 5 includes the hydrogen sulfide gas vessel 15 as well as the methane gas vessel 6 and the hydrogen gas vessel 7, however, has no thiophene tank 9, the device shown in FIG. 1 may be provided with the hydrogen sulfide bomb 15 in place of the thiophene tank 9, and the device shown in FIGS. 3 and 5 may be provided with the thiophene tank 9 in place of the hydrogen sulfide bomb 15.

Further, in the above description, although the present invention is applied to the examples in which the carbon nanotube is produced, the present invention is not limited to the carbon nanotube and may be widely applied to the production of carbonaceous materials including fullerenes, carbon nanotubes or the like.

Further, although the DC power source 4 is used as a power source for applying voltage to the part between a pair of the carbon rod electrodes 1 and 2, an AC power source may be used to apply voltage to the part or region between a pair of the carbon rod electrodes 1 and 2.

Further, although the carbon rod including Co and Ni serving as catalysts when the carbon nanotube is produced is employed for the carbon rod electrode 1 functioning as the anode, the catalyst is not limited to Co and Ni, Sc, V, Cr, Mn, Fe, Cu, Y, Zr, Nb, Mo, Pd, Ta, W, Au, Th, U, La, Ce, Pr, Nd, Gd, Tb, Dy, Ho, Er, Tm, Lu, or the like may be included as the catalysts in the carbon rod which forms the carbon rod electrode 1 serving as the anode.

Further, as the inert gas mixed with the gas including carbon such as the methane gas, helium, xenon, krypton and nitrogen gas as well as argon gas may be properly selected and employed. Industrial Applicability As described above, according to the present invention, a large amount of carbonaceous materials including fullerenes, especially, carbon nanotubes can be easily and readily produced with high yield.

Although the present invention has been described with reference to specific embodiments, those of skill in the at will recognize that changes may be made thereto without departing from the spirit and scope of the invention as set forth in the hereafter appended claims.

What is claimed is:

1. A method for producing fullerene comprising the steps of: providing a pair of carbon-based electrodes spaced apart to define a region therebetween; generating an arc discharge between the pair of carbon-based electrodes; and supplying a gas containing carbon that includes a hydrocarbon gas and sulfur to the region between the electrodes.

2. The method for producing fullerene according to claim 1 wherein the gas containing carbon is continuously supplied to the region between the pair of carbon-based electrodes.

3. The method for producing fullerene according to claim 1 wherein the hydrocarbon gas includes methane.

4. The method for producing fullerene according to claim 1 wherein an amount of inert gas is supplied in addition to the gas containing carbon to the region between the pair of carbon-based electrodes.

5. The method for producing fullerene according to claim 1 wherein the pair of carbon-based electrodes comprises an anode that includes a catalyst metal.

6. The method for producing fullerene according to claim 5 wherein the catalyst metal is selected from the group consisting of Co, Ni, Sc, V, Cr, Mn, Fe, Cu, Y, Zr, Nb, Mo, Pd, Ta, W, Au, Th, U, La, Ce, Pr, Nd, Gd, Tb, Dy, Ho, Er, Tm, Lu and mixtures thereof.

7. A device for producing fullerene comprising:
a pair of carbon rod electrodes; and
a gas supply mechanism capable of continuously supplying gas containing carbon to a region spaced between the pair of carbon rod electrodes.

8. The device for producing fullerene according to claim 7 wherein one of the pair of carbon rod electrodes has a through hole opened to the region spaced between the pair of carbon rod electrodes and wherein the gas supply mechanism is capable of supplying the gas containing carbon to the region between the pair of carbon rod electrodes via the through hole.

9. The device for producing fullerene according to claim 7 wherein the gas supply mechanism includes a pipe having a nozzle in juxtaposition to the region between the pair of carbon rod electrodes.

10. The device for producing fullerene according to claim 7 wherein a material gas supply source is further provided for supplying the gas containing carbon to the gas supply mechanism.

11. The device for producing fullerene according to claim 10 wherein the material gas supply source is adapted to supply gas containing hydrocarbon gas to the gas supply mechanism.

12. The device for producing fullerene according to claim 10 wherein the material gas supply source is adapted to supply methane to the gas supply mechanism.

13. The device for producing fullerene according to claim 10 wherein a sulfur adding mechanism for adding sulfur to the gas containing carbon is further provided between the material gas supply source and the gas supply mechanism.

14. The device for producing fullerene according to claim 7 wherein an inert gas supply source is further provided for supplying inert gas to the gas supply mechanism.

15. The device for producing fullerene according to claim 7 wherein the pair of carbon rod electrodes comprises an anode that includes a catalyst metal.

16. The device for producing fullerene according to claim 15 wherein the catalyst metal is selected from the group consisting of Co, Ni, Sc, V, Cr, Mn, Fe, Cu, Y, Zr, Nb, Mo, Pd, Ta, W, Au, Th, U, La, Ce, Pr, Nd, Gd, Tb, Dy, Ho, Er, Tm, Lu, and combinations thereof.

17. A method for producing fullerene comprising the steps of: providing a pair of carbon-based electrodes spaced apart to define a region therebetween; generating an arc discharge between the pair of carbon-based electrodes; and supplying a gas containing carbon to the region between the electrodes wherein the gas containing carbon includes methane and hydrogen sulfide.

18. A method for producing fullerene comprising the steps of: providing a pair of carbon-based electrodes spaced apart to define a region therebetween; generating an arc discharge between the pair of carbon-based electrodes; and supplying a gas containing carbon to the region between the electrodes wherein the gas containing carbon includes a hydrocarbon gas and wherein the gas containing carbon passes through thiophene so that the gas containing carbon includes sulfur.

19. The method of claim 18 wherein the gas containing carbon is bubbled in thiophene so that the gas containing carbon includes sulfur.

20. A method for producing fullerene comprising the steps of: providing a pair of carbon-based electrodes spaced apart to define a region therebetween; generating an arc discharge between the pair of carbon-based electrodes; and supplying a gas containing carbon to the region between the electrodes wherein an amount of hydrogen gas is supplied in addition to the gas containing carbon to the region between the pair of carbon-based electrodes.

21. A method for producing fullerene comprising the steps of: providing a pair of carbon-based electrodes spaced apart to define a region therebetween; generating an arc discharge between the pair of carbon-based electrodes; and supplying a gas containing carbon to the region between the electrodes wherein an amount of inert gas and hydrogen gas in addition to the gas containing carbon is supplied to the region between the pair of carbon-based electrodes.

22. A device for producing fullerene comprising:
a pair of carbon rod electrodes; and
a gas supply mechanism capable of continuously supplying gas containing carbon to a region spaced between the pair of carbon rod electrodes wherein a hydrogen gas supply source is further provided for supplying hydrogen gas to the gas supply mechanism.

23. A device for producing fullerene comprising:
pair of carbon rod electrodes; and
a gas supply mechanism capable of continuously supplying gas containing carbon to a region spaced between the pair of carbon rod electrodes wherein a hydrogen gas supply source for supplying hydrogen gas to the gas supply mechanism and an inert gas supply source for supplying inert gas to the gas supply mechanism is further provided.

24. A device for producing fullerene comprising:
a pair of carbon rod electrodes; and
a gas supply mechanism capable of continuously supplying gas containing carbon to a region spaced between the pair of carbon rod electrodes wherein a hydrogen sulfide supply source for supplying hydrogen sulfide to the gas supply mechanism is further provided.

* * * * *